(12) United States Patent
Pfleging et al.

(10) Patent No.: US 7,792,264 B2
(45) Date of Patent: Sep. 7, 2010

(54) RING TONE SELECTED BY CALLING PARTY OF THIRD PARTY PLAYED TO CALLED PARTY

(75) Inventors: Gerald W. Pfleging, Batavia, IL (US); George P. Wilkin, Bolingbrook, IL (US); David A. Zahn, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 537 days.

(21) Appl. No.: 11/087,442

(22) Filed: Mar. 23, 2005

(65) Prior Publication Data

US 2006/0215827 A1 Sep. 28, 2006

(51) Int. Cl.
*H04M 3/42* (2006.01)
*H04M 1/00* (2006.01)

(52) U.S. Cl. ............................. 379/207.16; 379/373.02

(58) Field of Classification Search ................ 455/415, 455/567; 379/207.13, 207.16, 82, 142.01, 379/142, 373.01, 373.022, 142.02, 373.02

See application file for complete search history.

(56) References Cited

U.S. PATENT DOCUMENTS

| | | | | |
|---|---|---|---|---|
| 5,890,117 | A * | 3/1999 | Silverman | 704/260 |
| 6,058,301 | A * | 5/2000 | Daniels | 455/411 |
| 6,901,139 | B2 * | 5/2005 | Gonzalez et al. | 379/207.16 |
| 2002/0098831 | A1 * | 7/2002 | Castell et al. | 455/413 |
| 2004/0196826 | A1 * | 10/2004 | Bao et al. | 370/352 |
| 2005/0143103 | A1 * | 6/2005 | Bjorgan et al. | 455/466 |
| 2006/0068765 | A1 * | 3/2006 | Perdomo | 455/412.2 |
| 2006/0160579 | A1 * | 7/2006 | Ure | 455/567 |
| 2006/0178138 | A1 * | 8/2006 | Ostroff et al. | 455/426.1 |

* cited by examiner

*Primary Examiner*—Ahmad F Matar
*Assistant Examiner*—Nafiz E Hoque
(74) *Attorney, Agent, or Firm*—Carmen Patti Law Group, LLC

(57) ABSTRACT

A ring tone is played to a called party for a call that meets one or more criteria. The ring tone is remotely selected by a calling party or a third party.

20 Claims, 2 Drawing Sheets

RING TONE SELECTED BY CALLING PARTY OF THIRD PARTY PLAYED TO CALLED PARTY

TECHNICAL FIELD

The invention relates generally to communications and more particularly to ring tones.

BACKGROUND

Phones often play an audible sound upon receipt of an incoming call. For example, the phone may play a ring tone to a user of the phone to indicate the presence of the incoming call. In mobile phones, the ring tone is a computer program stored in the memory of the mobile phone. The ring tone indicates what audible sound the speaker system of the phone should play when the phone receives an incoming call. Ring tone capable phones have a range of notes stored in memory. The ring tone indicates which of these notes to play to achieve the desired audible sound. Different ring tones produce different audible sounds by adjusting the order, speed, and number of the notes.

Mobile phones are often delivered to a user with a limited number of ring tones stored in memory. Additional ring tones may be downloaded by the user of the mobile phone to personalize the ringing sound of the phone. In one example, the user of the mobile phone may type in the program code of the additional ring tone into the phone using the keypad. In another example, the user of the mobile phone may order the additional ring tone from a website that sends the ring tone to the phone over the airwaves. For example, the ring tone is sent in a message to the mobile phone, such as in a short message service message, an enhanced messaging service message, or a multimedia messaging service message.

The user of the mobile phone installs the ring tone onto the phone for subsequent use for incoming calls. The user of the mobile phone authorizes the phone to use the ring tone. For example, the user of the mobile phone must authorize and assign the ring tone for the ring tone to be eligible for active use by the phone. As one shortcoming, the user of the called mobile phone has exclusive control over the ring tones played over the speaker of the phone for incoming calls.

In addition to being played over a speaker to the called party for incoming calls, customized audible sounds may be played in a voice path to the calling party. A ringback tone service allows a called party to preselect a ringback tone to be played in the earpiece of the calling party phone. Traditionally, the calling party would hear a standard ringing sound before the called party answers the call. The ringback tone service replaces that standard ringing sound with a ringback tone selected by the called party. For example, the ringback tone service allows the user of the called communication device to customize the ringing sound that the calling party hears while calling the called party. As one shortcoming, the ringback tone service does not play customized ring tones to the called party.

Thus, a need exists for enhanced control of ring tones played to a called party for incoming calls.

SUMMARY

The invention in one implementation encompasses a method. A ring tone is played to a called party for a call that meets one or more criteria. The ring tone is remotely selected by a calling party or a third party.

Another implementation of the invention encompasses an apparatus. The apparatus comprises a ring tone server that receives an indication that a calling party or a third party has selected a ring tone for a call, to a called party, that meets one or more criteria. The ring tone server plays the ring tone to the called party for the call that meets the one or more criteria.

Yet another implementation of the invention encompasses an article. The article comprises one or more computer-readable signal-bearing media, and means in the one or more media for playing a ring tone to a called party for a call that meets one or more criteria. The ring tone is remotely selected by a calling party or a third party.

DESCRIPTION OF THE DRAWINGS

Features of exemplary implementations of the invention will become apparent from the description, the claims, and the accompanying drawings in which:

DETAILED DESCRIPTION

Figure 1:
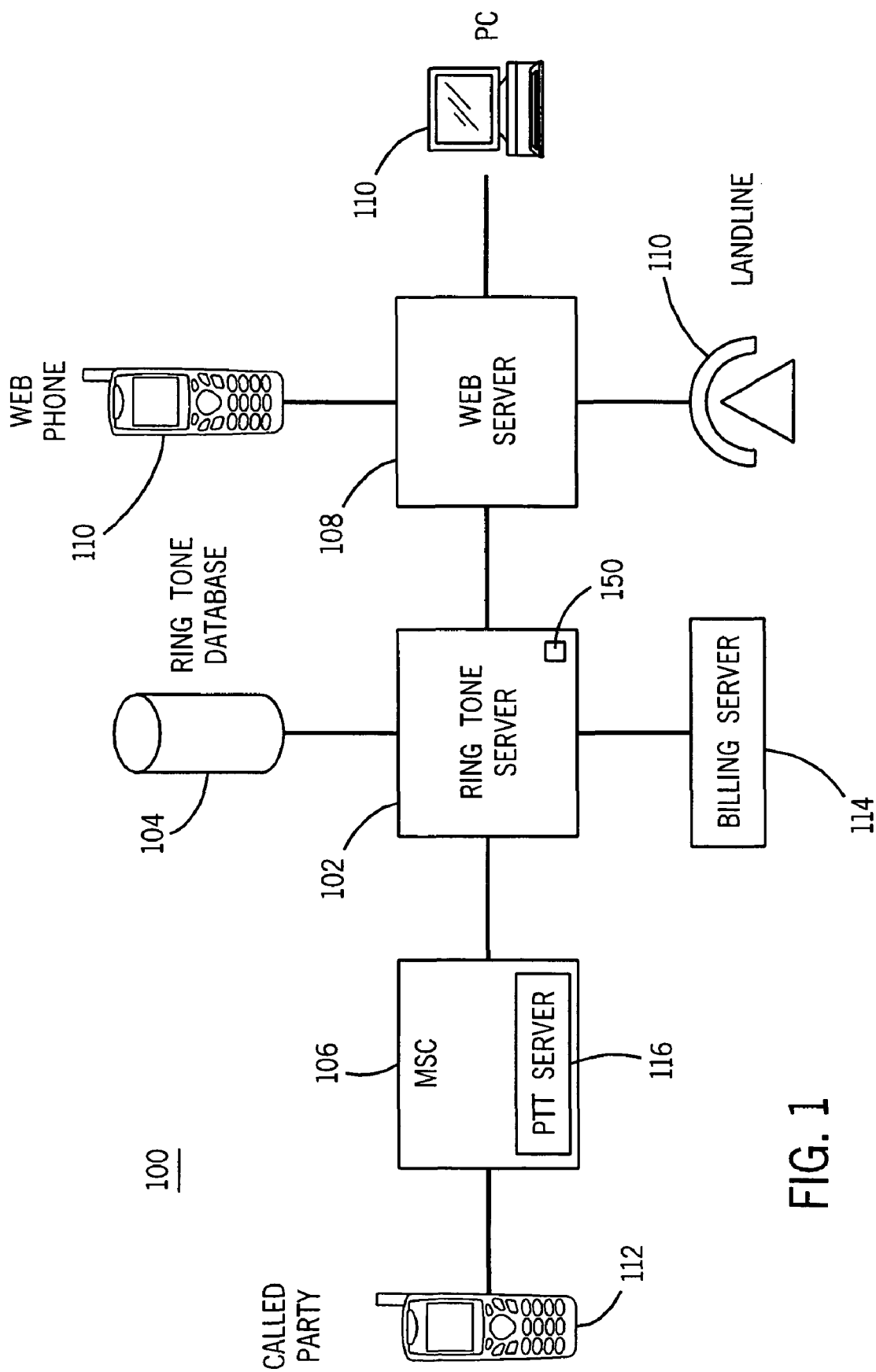
FIG. 1 is a representation of one implementation of an apparatus that comprises one or more ring tone servers, one or more ring tone databases, one or more mobile switching centers, one or more web servers, one or more input devices, and one or more called parties.

Turning to FIG. 1, an apparatus 100 in one example comprises one or more ring tone servers 102, one or more ring tone databases 104, one or more mobile switching centers ("MSCs") 106, one or more web servers 108, one or more input devices 110, and one or more called parties 112. The apparatus 100 illustrates a ring tone selection service. The ring tone selection service allows a calling party or a third party to select a ring tone for a called party. The apparatus 100 in one example further comprises a billing server 114 to maintain billing records. The ring tone server 102 sends billing reports incurred by users of the ring tone selection service to the billing server 114.

The ring tone server 102 plays a ring tone to the called party 112 for a call that meets one or more criteria. The ring tone and the criteria are remotely selected by a calling party or a third party. The calling party or the third party remotely selects the ring tone by using a device that is separate from the called party phone to select a ring tone to be played by the called party phone. For example, the calling party or the third party employs one of the input devices 110 to enter the ring tone selection and the criteria. The called party 112 in one example is unaware that the calling party or the third party has selected a ring tone for the called party 112. The ring tone server 102 comprises an instance of a recordable data storage medium 150, as described herein.

The ring tone database 104 stores ring tones for use by the ring tone server 102. The ring tone server 102 accesses the ring tone database 104 to acquire ring tones to play to the called party 112. The ring tone database 104 may organize the ring tones by category, type, rating, or the like. In addition to ring tones, the ring tone database may store music and/or recorded voice. For example, a user may create a personal audio recording, such as a spoken message, to be played to the called party 112 as the ring tone for an incoming call.

The mobile switching center ("MSC") 106 supports mobile phones, such as the called party 112. The mobile switching center 106 connects incoming calls to the called party 112. The mobile switching center 106 couples the ring tone server 102 with the called party 112. The mobile switching center 106 in one example comprises a push-to-talk server 116. The ring tone server 102 in one example employs the push-to-talk server 116 to establish a push-to-talk session with the called party 112. The ring tone server 102 plays calling party or third party selected ring tones over the push-to-talk session to the called party 112.

The web server 108 couples the input devices 110 with the ring tone server 102. The input devices 110 may comprise mobile phones, landline phones, computers ("PC"), personal digital assistants ("PDAs"), and the like. Users employ the input devices 110 to set up the ring tone selection service. For example, the users select a ring tone and enter the criteria used by the ring tone server 102 to determine when to play the ring tone.

In one example, the users access a website to enter the ring tone selection and the trigger criteria. In another example, the web server 108 presents an Internet based application to the input devices 110 to allow the users to enter the ring tone selection and the trigger criteria. In yet another example, the input devices 110 connect with a touch tone or voice recognition system to enter the ring tone selection and the trigger criteria.

In addition to the ring tone selection and the trigger criteria, the users of the input devices 110 enter calling party information, called party information, and billing information. The ring tone server 102 sends a billing report to the billing server 114 to charge the user that selected the ring tone. In addition to selection of a ring tone for an individual called party, users may select a ring tone for an entire group. One ring tone may be selected for all incoming calls to phones associated with a corporation. For example, the ring tone may be set to a corporate jingle. Another option for the ring tone selection service is for the ring tone server 102 to send an identity verification request to the calling party before playing the selected ring tone to the called party 112. The ring tone server 102 waits for confirmation of the identity verification request before playing the ring tone to the called party 112. The verification request serves to prevent a third party from setting up a vindictive or offensive ring tone for a call from a calling party that does not authorize the ring tone. The verification request gives the calling party the opportunity to cancel the selected ring tone if desired.

The called party 112 comprises a called communication device and a user of that called communication device. The called communication device is capable of connecting to a telecommunication network and receiving a ring tone. For example, the called communication device may comprise a mobile phone, personal digital assistant ("PDA"), wireless of wired voice over Internet Protocol ("VoIP") phone, wireless-fidelity ("Wi-Fi") phone, or the like. An exemplary implementation of the called communication device as a mobile phone is illustrated herein. Other called communication devices may also be employed, as will be appreciated by those skilled in the art.

In one example, the ring tone server 102 sends the ring tone to the called party 112 in a data message. For example, the called communication device is capable of receiving data messages, such as short message service messages, enhanced messaging service messages, multimedia messaging service messages, Java application messages, or the like. The called communication device also comprises a buffer, temporary storage, or permanent storage capable of storing the ring tone.

The ring tone server 102 transfers a copy of the ring tone from the ring tone database 104 to the called communication device. The called communication device stores the ring tone and waits for an incoming call that meets the criteria, set by the party that selected the ring tone, which triggers the called communication device to play the ring tone for the call. The called communication device comprises internal logic to compare characteristics of the incoming calls to the criteria set by the set by the party that selected the ring tone. For example, the criteria may indicate to play a calling party selected ring tone for an incoming call from a certain calling party number. If an incoming call is from that calling party number, the called communication device plays the calling party selected ring tone in place of the called party selected ring tone. If an incoming call is from a different calling party number, the called communication device plays the called party selected ring tone.

In another example, the ring tone server 102 plays the ring tone for a call to the called party 112 over a push-to-talk session. For example, the called communication device is capable of supporting push-to-talk sessions. Before connecting the call to the called party 112, the ring tone sever 102 establishes a push-to-talk session with the called party 112. The ring tone server 102 in one example streams a calling party selected ring tone to the user of the called communication device over the push-to-talk session. Where the ring tone server 102 plays the ring tone over the push-to-talk session, the called communication device does not require internal logic to determine when to play the calling party selected ring tone, or storage for the ring tone. The logic to determine when to play the ring tone is in the ring tone server 102, and the ring tone database 104 stores the ring tone.

Figure 2:
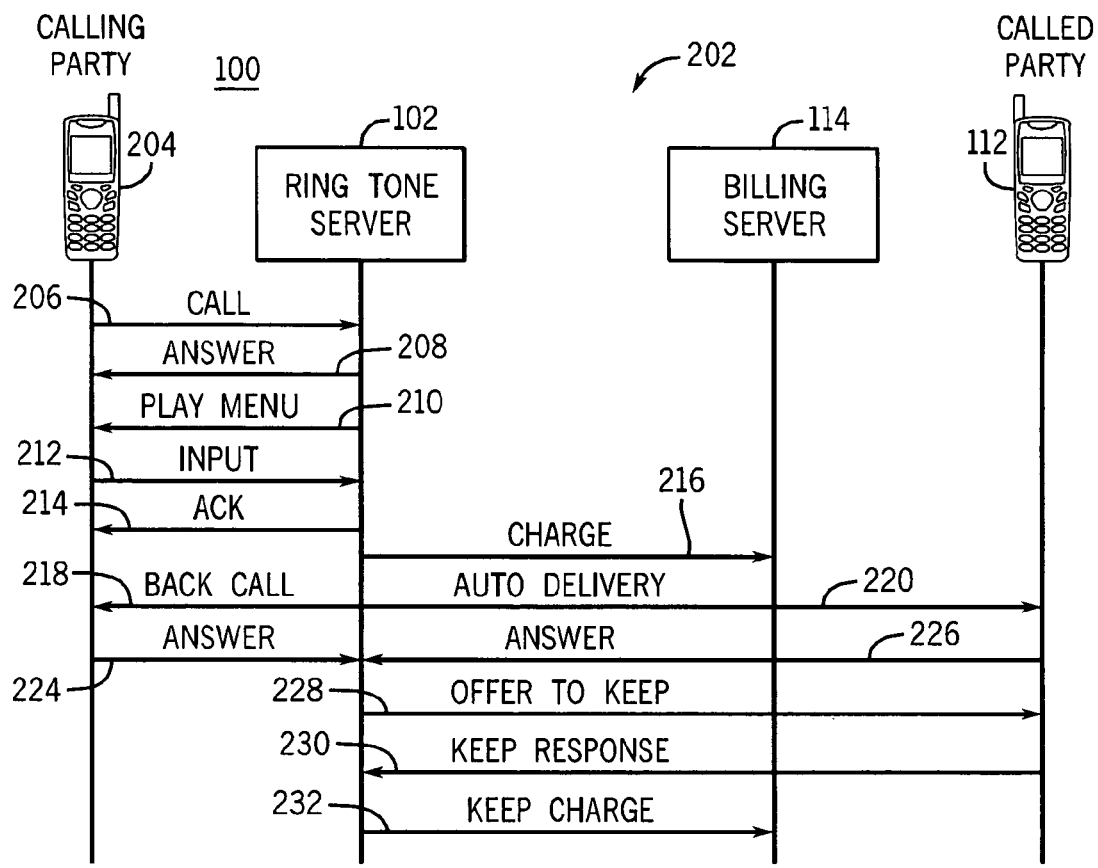
FIG. 2 is a representation of one exemplary message flow for a selection of a ring tone by a calling party for a call to the called party of the apparatus of FIG. 1.

Turning to FIG. 2, an illustrative description of an exemplary operation of the apparatus 100 is presented, for explanatory purposes. A message flow 202 illustrates a selection of a ring tone by a calling party 204 for a call to the called party 112 that meets one or more criteria. For example, the message flow 202 illustrates a ring tone selection service. The message flow 202 further illustrates playing the ring tone to the called party 112 for the call. The calling party 204 in one example comprises one of the input devices 110 (FIG. 1), such as a mobile phone.

To set up the ring tone selection service, the calling party 204 initiates a call 206 to the ring tone server 102. Upon receipt of the call 206, the ring tone server 102 sends an answer message 208 back to the calling party 204. After sending the answer message 208, the ring tone server 102 plays a menu 210 to the calling party 204. In one example, the menu 210 comprises a audible announcement that prompts the calling party 204 to respond with input 212 by pressing touch tone keys or providing voice response. The ring tone server 102 comprises touch tone recognition or voice recognition capabilities to interpret the input 212 from the calling party 204. In another example, the calling party 204 comprises an internet capable phone with a display screen, and the menu 210 is displayed on the display screen of the phone. For example, the menu 210 comprises an internet based ring tone provisioning application.

The menu 210 in one example provides the calling party 204 with a list of ring tones available for selection and a list of triggering options. The calling party 204 selects a ring tone from the list of available ring tones. The menu 210 also requests the calling party 204 to select one or more of the triggering options. The calling party 204 inputs one or more criteria to indicate the selected triggering options. The ring tone server 102 employs the one or more criteria to determine when to play the selected ring tone to the called party 112. For example, the one or more criteria may comprise an indication to play the ring tone for a call at a certain time, or for a call from a certain calling party number.

The calling party 204 sends an indication of the selected ring tone and the one or more criteria to the ring tone server 102 as the input 212. The called party 112 also includes calling information in the input 212, such as the calling party number and the called party number. Additionally, the called party 112 enters billing information for use in funding the ring tone selection service transaction. After receipt of the input 212, the ring tone server 102 sends an acknowledgement message 214 to the calling party 204 to confirm the transaction.

The ring tone server 102 in one example charges a fee for the ring tone selection service. The ring tone server 102 sends a charge message 216 to the billing server 114 to charge the calling party 204 a fee for selection of the ring tone to be played to the called party 112. The calling party 204 in one example may select to apply the ring tone to a single call to the called party 112, a plurality of calls to the called party 112, all calls to the called party 112, calls to a group of called parties, or all calls to all called parties. For example, different ring tone selection options may have different costs.

After the calling party 204 has selected the ring tone for the call and the one or more criteria that indicate when to play the ring tone, the ring tone server 102 waits until the one or more criteria are met to trigger the ring tone service. In one example, the one or more criteria indicate for the ring tone server 102 to trigger the ring tone service for a call from a specific calling party number, such as the number of the calling party 204. The ring tone server 102 waits for a call from that calling party number. Upon receipt of the call from the calling party 204, the ring tone server 102 plays the ring tone to the called party 112 and extends the call to the called party 112. In another example, the one or more criteria indicate for the ring tone server 102 to trigger the ring tone service at a specific time chosen by the calling party 204. At the time chosen by the calling party 204, the ring tone server 102 employs a back call 218 to establish a connection with the calling party 204. The ring tone server 102 extends the call to the called party 112, and delivers 220 the ring tone to the called party 112. The calling party 204 sends an answer message 224 to the ring tone server 102 to accept the call. The called party 112 sends an answer message 226 to the ring tone server 102 to accept the call. Then, the ring tone server 102 connects the call between the calling party 204 and the called party 112 to establish voice communication.

In one example, the ring tone delivery 220 to the called party 112 is over a push-to-talk session. For example, before extending the call to the called party 112, the ring tone server 102 establishes a push-to-talk session with the called party 112 and streams the ring tone to the called party 112 during the push-to-talk session. After the ring tone is finished or the call is answered by the called party 112, the ring tone server 102 ends the push-to-talk session and transitions to a voice conversation. For example, the ring tone server 102 waits for the ring tone to be finished or the call to be answered before connecting the voice call to the called party 112. Upon completion of the ring tone in the push-to-talk session, the ring tone server 102 sends one or more call setup messages to the called party 112 to establish the voice conversation between the called party 112 and the calling party 204. The ring tone server 102 in one example suppresses the standard push-to-talk session beeps while playing the ring tone in the push-to-talk session. The ring tone server 102 may also suppress the normal ring tone chosen by the called party 112 for incoming calls because the ring tone selected by the called party 112 has already been played in the push-to-talk session.

In another example, the ring tone delivery 220 to the called party 112 is accomplished by sending the ring tone to the phone used by the called party 112. For example, the ring tone server 102 may send the ring tone and the one or more trigger criteria to the phone in a short message service message, an enhanced messaging service message, a multimedia messaging service message, a Java application, or the like. The phone accepts the ring tone in a buffer or stores the ring tone in available memory. After the ring tone is transferred to the phone, the phone will not use the ring tone until receipt of a call that meets the trigger criteria set by the calling party 204 for the ring tone. Upon receipt of the call that meets the trigger criteria, the phone will play the calling party selected ring tone instead of the called party selected ring tone.

After playing the selected ring tone to the called party 112, the ring tone server 102 in one example sends an offer 228 to the called party 112. The offer 228 presents the option for the called party 112 to keep the ring tone played for the call. For example, the ring tone server 102 in one example sends the offer 228 to the called party 112 after the single use of the ring tone for the call. The called party 112 has the option to purchase the ring tone for additional use. The called party 112 may select to keep the ring tone for a day, a week, forever, based on a number of uses, or the like. The called party 212 in one example sends a response 230 to the offer 228. If the response 230 indicates that the called party 112 does not want to purchase the ring tone, then the ring tone server 102 deletes the ring tone from the phone of the called party 112. For example, the ring tone server 102 may send a message to the phone to clear the buffer or memory that was used to store the ring tone. If the response 230 indicates that the called party 112 wants to purchases the ring tone, the ring tone server 102 sends a charge message 232 to the billing server 114 to charge the called party 112 a fee for keeping the ring tone for additional use. Alternatively, the ring tone server 102 may charge the calling party 204 for the additional use of the ring tone by the called party 112. For example, the calling party 204 may purchase the ring tone as a gift to the called party 112. After charging the called party 112 or the calling party 204 for the ring tone, the ring tone server 102 releases the ring tone for the additional use by called party 112. For example, the ring tone is transferred from temporary storage on the phone to a permanent storage, such as in flash memory or on a subscriber identity module ("SIM") card.

Figure 3:
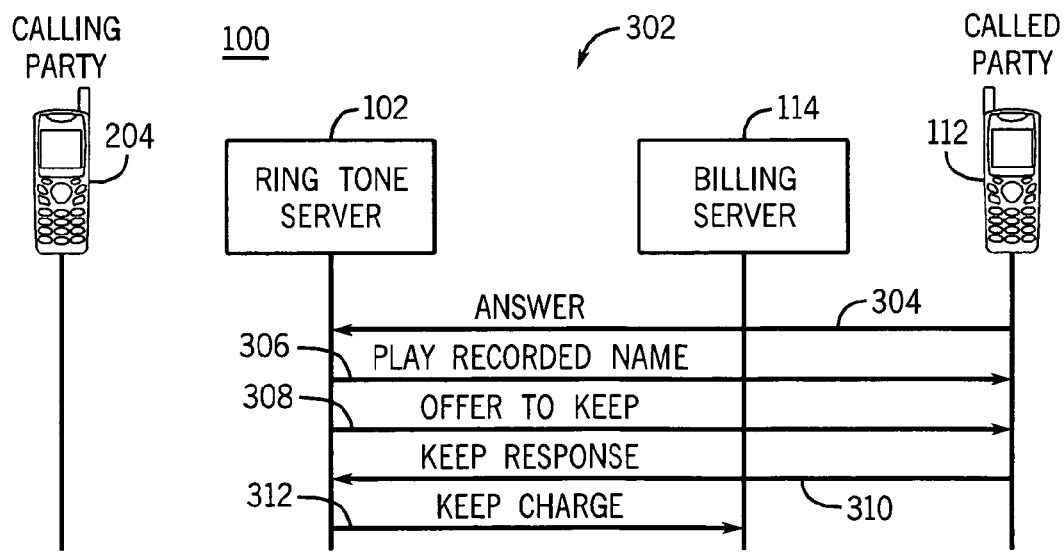
FIG. 3 is a representation of one exemplary message flow for a call to the called party of the apparatus of FIG. 1, where the called party does not answer the call.

Turning to FIG. 3, a message flow 302 represents an exemplary call to the called party 112, where the called party 112 does not answer the call. The message flow 302 begins after the attempted ring tone delivery 220 of FIG. 2. The message flow 302 illustrates a connection to voicemail after determining that the called party 112 did not answer the call. Once the called party 112 does not answer the call within an allotted time period, the voicemail system sends an answer message 304 to the ring tone server 102. The answer message 304 indicates that the voicemail system is handling the call. The ring tone server 102 plays the recorded name 306 of the party that selected the ring tone (e.g., the calling party 204) in a voicemail message. The ring tone server 102 also includes in the message an offer 308 to acquire the ring tone selected by the calling party 204 for subsequent use. The called party 112 in one example sends a response 310 to the offer 308. If the response 310 indicates that the called party 112 wants to purchases the ring tone for subsequent use, the ring tone server 102 sends a charge message 312 to the billing server 114 to charge the called party 112 or the calling party 204 a fee for keeping the ring tone for additional use. The ring tone server 102 then releases the ring tone for the use by called party 112.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 150 of the ring tone server 102. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the step of:
    establishing, by a ring tone server, a push-to-talk session with a called party upon receipt of a voice call to the called party, wherein the called party comprises a user and a called communication device capable of supporting push-to-talk sessions, wherein the voice call meets one or more criteria;
    streaming, by a ring tone server, a ring tone for the voice call to the called party during the push-to-talk session, wherein the ring tone is remotely selected by a calling party or a third party;
    playing the ring tone for the voice call to the called party during the push-to-talk session;
    ending the push-to-talk session and establishing the voice call between the called party and the calling party.

2. The method of claim 1, wherein the step of playing the ring tone for the voice call to the called party during the push-to-talk session comprises the steps of:
    sending the ring tone to memory in the called communication device for a single use on the call that meets the one or more criteria; and
    triggering the called communication device to play the ring tone to the user upon receipt of the call that meets the one or more criteria.

3. The method of claim 2, further comprising the steps of:
    sending a message to the called communication device after the single use of the ring tone to offer the user the option to purchase the ring tone for additional use;
    releasing the ring tone for the additional use, if the user purchases the ring tone; and
    deleting the ring tone from the called communication device, if the user does not purchase the ring tone.

4. The method of claim 1, further comprising the step of:
    sending one or more call setup messages to the called party upon completion of the ring tone during the push-to-talk session to establish the voice call between the called party and the calling party.

5. The method of claim 1, wherein the ring tone comprises a calling party selected ring tone, the method further comprising the step of:
    suppressing a called party selected ring tone used for incoming voice calls, after playing the calling party selected ring tone during the push-to-talk session.

6. The method of claim 1, wherein the calling party selects the ring tone for the call to the called party, the method further comprising the steps of:
    sending a menu to the calling party at an input device to allow the calling party to input an identification of the called party, an identification of the ring tone, and the one or more criteria; and
    receiving an indication that the calling party has selected the ring tone for the call to the called party that meets the one or more criteria.

7. The method of claim 1, wherein the step of playing the ring tone for the voice call to the called party comprises the steps of:
    sending an identity verification request to the calling party; and
    waiting for confirmation of the identity verification request before playing the ring tone to the called party.

8. The method of claim 1, wherein the step of playing the ring tone for the voice call to the called party comprises the steps of:
    determining that the called party did not answer the call;
    playing a recorded name of the calling party on a voicemail message; and
    providing the called party with an option to acquire the ring tone selected by the calling party for subsequent use.

9. An apparatus, comprising:
    a ring tone server that receives a voice call with an indication that a calling party or a third party has selected a ring tone for the voice call, to a called party, that meets one or more criteria;
    wherein the ring tone server establishes a push-to-talk session with the called party upon receipt of the voice call, wherein the called party comprises a user and a called communication device capable of supporting push-to-talk sessions;
    wherein the ring tone server streams the ring tone for the voice call to the called party during the push-to-talk session;
    wherein the ring tone server ends the push-to-talk session and establishes the voice call between the called party and the calling party.

10. The apparatus of claim 9, wherein the one or more criteria comprise an instruction for the ring tone server to play the ring tone to the called party at a certain time.

11. The apparatus of claim 9, wherein the one or more criteria comprise an instruction for the ring tone server to play the ring tone to the called party for the call from a certain calling party number.

12. The apparatus of claim 9, wherein the ring tone server receives the one or more criteria, wherein the one or more criteria indicate a time to initiate the call between the calling party and the called party;
wherein at the time indicated by the one or more criteria, the ring tone server employs a back call to establish a connection with the calling party and delivers the ring tone to the called party.

13. The apparatus of claim 9, wherein the ring tone server receives the one or more criteria, wherein the one or more criteria indicate a calling party number;
wherein upon receipt of the call from the calling party number for the called party, the ring tone server plays the ring tone to the called party.

14. The apparatus of claim 9, wherein upon completion of the ring tone during the push-to-talk session, the ring tone server sends one or more setup messages to the called party to establish the voice call between the called party and the calling party.

15. The apparatus of claim 9, wherein the ring tone server sends the ring tone to memory in the called communication device for a single use on the call that meets the one or more criteria;
wherein the ring tone server triggers the called communication device to play the ring tone to the user upon receipt of the call that meets the one or more criteria.

16. The apparatus of claim 15, wherein the ring tone server sends a message to the called communication device after the single use of the ring tone to offer the user the option to purchase the ring tone for additional use;
wherein if the user purchases the ring tone, the ring tone server releases the ring tone for the additional use;
wherein if the user does not purchase the ring tone, the ring tone server deletes the ring tone from the called communication device.

17. The apparatus of claim 9, further comprising a user interface for the calling party or the third party to input to the ring tone server an identification of the called party, an identification of the ring tone for the call to the called party, and the one or more criteria.

18. The apparatus of claim 17, wherein the user interface comprises a web server and an input device, wherein the input device comprises a computer or a phone;
wherein a user employs the input device to enter the identification of the called party, the identification of the ring tone for the call to the called party, and the one or more criteria;
wherein the web server sends the identification of the called party, the identification of the ring tone for the call to the called party, and the one or more criteria to the ring tone server;
wherein the ring tone server employs the one or more criteria to determine when to play the ring tone to the called party.

19. An article, comprising:
one or more non-transitory computer-readable media;
means in the one or more media for establishing, by a ring tone server, a push-to-talk session with a called party upon receipt of a voice call to the called party, wherein the voice call meets one or more criteria, wherein the called party comprises a user and a called communication device capable of supporting push-to-talk sessions;
means in the one or more media for streaming, by a ring tone server, a ring tone for the voice call to the called party during the push-to-talk session, wherein the ring tone is remotely selected by a calling party or a third party,
means in the one or more media for playing the ring tone for the voice call to the called party during the push-to-talk session;
means in the one or more media for ending the push-to-talk session and establishing the voice call between the called party and the calling party.

20. The method of claim 1, wherein the step of playing the ring tone for the voice call to the called party during the push-to-talk session comprises the step of:
suppressing a standard push-to-talk session beep while playing the ring tone in the push-to-talk session.

* * * * *